Feb. 24, 1953  W. KNAUF  2,629,301
PHOTOGRAPHIC CAMERA CONSTRUCTION
Filed Nov. 14, 1950  3 Sheets-Sheet 1

INVENTOR.
Wilhelm Knauf
BY Charles Shepard
Attorney

Feb. 24, 1953 W. KNAUF 2,629,301
PHOTOGRAPHIC CAMERA CONSTRUCTION
Filed Nov. 14, 1950 3 Sheets-Sheet 2

INVENTOR.
Wilhelm Knauf
BY Charles Shepard
Attorney

Feb. 24, 1953  W. KNAUF  2,629,301
PHOTOGRAPHIC CAMERA CONSTRUCTION
Filed Nov. 14, 1950  3 Sheets-Sheet 3
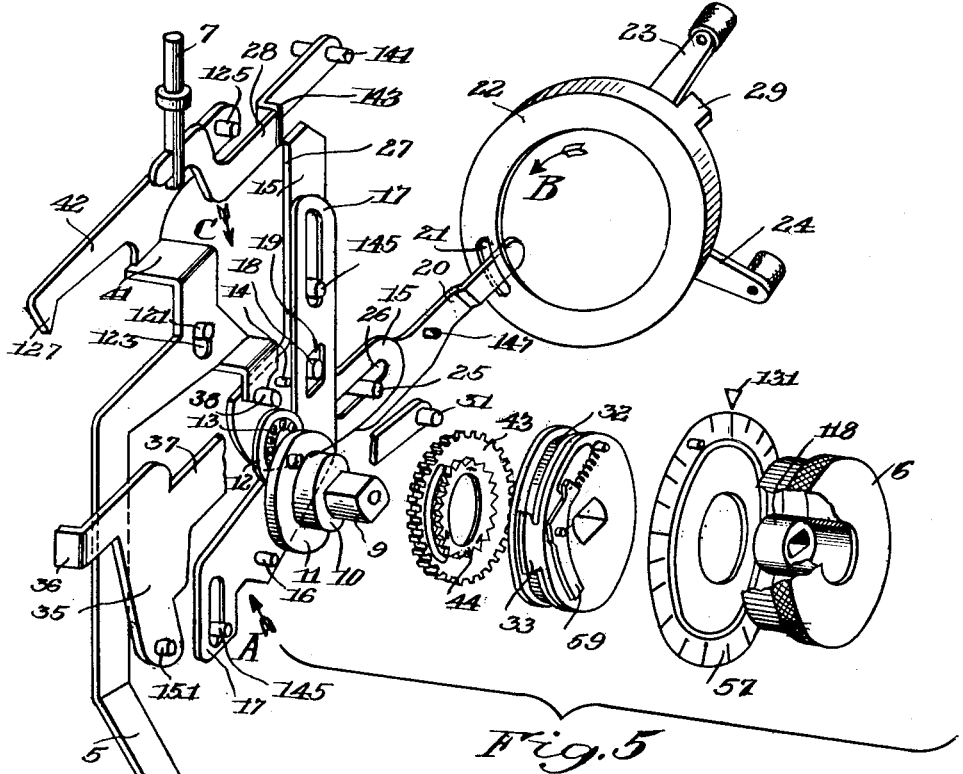
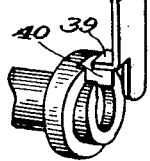
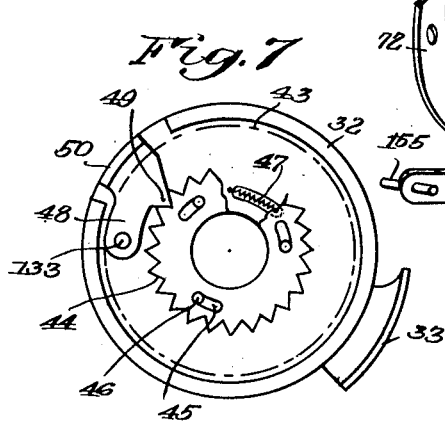
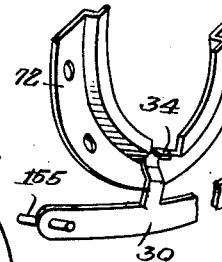
INVENTOR.
Wilhelm Knauf
BY Charles Shepard
Attorney Patented Feb. 24, 1953

2,629,301

UNITED STATES PATENT OFFICE 2,629,301

PHOTOGRAPHIC CAMERA CONSTRUCTION

Wilhelm Knauf, Braunschweig, Germany, assignor to Franke & Heidecke, Fabrik Photographischer Prazisions-Apparate, Braunschweig, Germany, a firm Application November 14, 1950, Serial No. 195,545
In Germany October 31, 1949

14 Claims. (Cl. 95—31)

The present invention relates to photographic cameras and especially but not exclusively to cameras of relatively small size, commonly known as miniature cameras.

An object of the invention is the provision of generally improved and more satisfactory cameras, particularly with reference to the mechanism for holding the film and for measuring the length of film which is fed between successive exposures; and also with reference to the mechanism for performing a plurality of functions from the operation of the film winding knob.

Another object of the invention is the provision of improved film metering or film measuring mechanism so designed and constructed that in addition to stopping the film at the proper point in a winding operation, it will also serve to hold the film taut while the exposure is being taken, the mechanism preferably also having provision for disconnecting the metering or measuring parts when the final length of film is to be wound on the winding spool.

Still another object of the invention is the provision of improved means operated by rotation of the film winding member, for not only winding the film but also cocking or setting the shutter ready for the next exposure, locking the shutter release against premature operation, moving the film presser plate to a released position, and operating the film exposure counting or position indicating device, all in an easy manner without any undue friction or heavy resistance points during the rotation of the film winding member.

These and other desirable objects may be attained in the manner disclosed as an illustrative embodiment of the invention in the following description and in the accompanying drawings forming a part hereof, in which:

Fig. 5 is a diagrammatic and partially exploded perspective view, from the right rear, of the film winding knob and certain associated parts operated thereby;

Fig. 6 is a diametrical cross section taken axially through the exposure counter disk or film position indicating disk;

Fig. 7 is a view of the inner face or left hand face of one of the coupling members shown in Fig. 5, together with associated parts diagrammatically illustrated; and Fig. 8 is a perspective view, from the right rear, of certain mechanism associated with the disk shown in Fig. 7.

The same reference numerals throughout the several views indicate the same parts.

Figure 1:
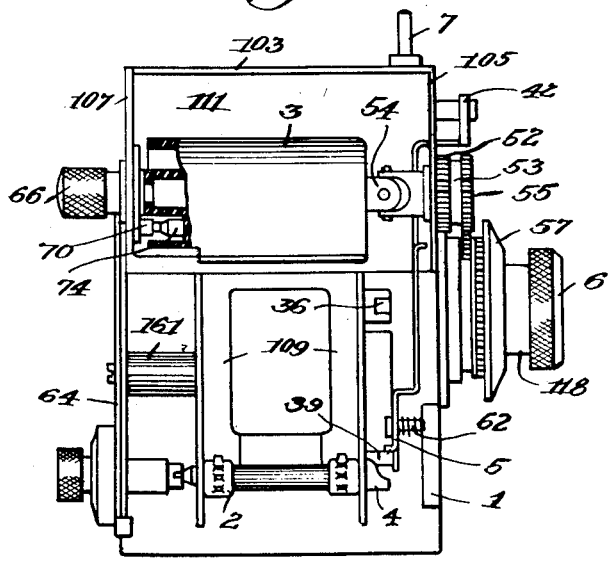
Fig. 1 is a rear elevation of a camera in accordance with a preferred embodiment of the invention, with the back cover removed to show certain interior parts and with some parts broken away.

The camera here shown as an illustrative embodiment of the invention includes a main body having a front wall 101, a top wall 103, a right side wall 105 and a left side wall 107, and various other suitable walls and partitions. The walls 105 and 107 are not necessarily the outside walls of the right and left sides of the camera; indeed they are preferably covered by suitable outside walls (not shown) to hide and protect various mechanism mounted on the outer surfaces of these walls 105 and 107.

The unexposed film is held on a suitable reel or spool in a spool chamber near the bottom of the camera, part of which is indicated diagrammatically at 1. From this chamber, the film passes rearwardly and partly around a measuring or metering roller 2, thence extends upwardly in the focal plane of the camera, along rails or guideways 109, against the rear faces of which the edges of the film are preferably held tightly by a film presser plate (not shown) of any conventional design, while the film is not moving, pressure of this plate against the film being released or relieved when the film is moved, as described hereafter. After passing the focal plane and leaving the exposure area, the film moves upwardly into the spool chamber 111, where it is wound on any suitable spool, preferably within the cassette 3.

Light is admitted to the exposure chamber and to the portion of the film lying against the guideway 9 in the exposure area of the focal plane, by operation of a shutter 8 mounted on the front wall 101, and having a suitable lens associated therewith. When an exposure is to be made, the shutter is preferably released or tripped by a release plunger 7 extending up to an accessible position above the top wall 103 of the camera body. After the exposure is made, the knob 6 is turned through approximately one full revolution; to feed the film and preferably also to perform other functions such as to cock or set the shutter ready for the next exposure, to release the film presser plate so that it will not drag on the film while the film is being fed; to operate the exposure counter or film position indicator; and to do various other things, as explained in greater detail below. In fact the knob 6 and its associated parts constitute a rotary, manually operated, central control and motivating cycle member which, through branching connections, reaches to all of these otherwise independent elements and assemblies and coordinates their separate operations.

Figure 2:
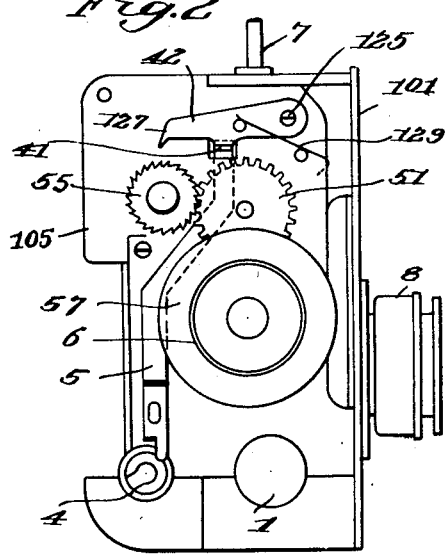
Fig. 2 is a side elevation of the right hand side of the camera, with certain overlying members removed to show the parts beneath.

The film winding mechanism includes the winding knob 6 accessible at the right hand side of the camera, this knob having a hub 118 provided with a non-circular central opening for driving engagement with the non-circular shaft 9 (Fig. 5) to which is fixed a circular hub portion 10 and a disk 11, the parts 9, 10, and 11 being journaled for rotation on the side wall 105. Freely rotatable on the circular hub portion 10 is a gear 43 driven from the shaft portion 9 by means hereafter described. The periphery of this gear 43 meshes with a gear 51 (Fig. 2) journaled on the side wall 105 of the camera, which gear 51 in turn meshes with a gear 52 which is connected by a friction clutch indicated in general at 53 (Fig. 1) to the film wind driving shaft 54 which extends into driving engagement with the film take-up reel or spool located, for example, within the cassette 3.

To measure the extent of the advancing movement of the film, the roller 2 is caused to turn with the advance of the film, preferably by having sprocket teeth on the roller 2 for engaging the sprocket holes of the film, if the film is of the miniature kind having sprocket holes or perforations along the edges. The diameter of the roller 2 is so chosen that this roller could make exactly one complete revolution during the advance of the film from one exposure to the next. The roller 2 is rotatable on the axle or shaft 63, and at the right end of the roller is a notch 61 normally engaged by a clutch tooth or pawl 60 on the hub 4 which is fixed to the shaft 2. This hub also has at its right end a notch 40, into which can drop a tooth 39 on a bar 5 mounted for vertical sliding movement on the wall 105 of the camera and guided for such movement by a fixed pin 121 on the camera which enters a short vertical slot 123 (Fig. 5) of the arm 5. At its upper end the arm 5 has a lateral ear 41 which underlies a portion of a pawl 42 which is pivoted at its forward end on a fixed pivot 125 of the camera body and has an effective end or nose 127 which, in its depressed position, will engage the teeth of the gear 55 which is rigidly fastened to the winding shaft 54. A spring 129 (Fig. 2) constantly tends to depress the end 127 of the pawl into engagement with the gear 55, except when it is held in an upper position by the ear 41 on the member 5.

With this construction, when the film is wound by rotation of the gear 43 (driven by the knob 6 in a manner described below) the movement of the film turns the roller 2 and the member 4 until, at the completion of the feeding operation, the notch 40 on the member 4 comes opposite the tooth 39, which then drops down into the notch 40 and locks the members 2 and 4 against further rotation. The downward movement of the tooth 39 allows the entire member 5 to move downwardly so that the pawl 42 moves down and its nose 127 engages with and locks the teeth of the gear 55, stopping the rotation of the film feeding shaft 54. If the gear 43 has not yet completed its full cycle of movement at this time, this does not matter, as the gear 43 may continue to turn and may continue to drive the idle gear 51 and the feeding gear 52, since the latter is connected to the shaft 54 by the slip clutch 53 and so the gear 52 may simply slip this clutch and may continue to turn so far as necessary, even though the shaft 54 is held stationary by engagement of the pawl 42 with the gear 55. Thus the take-up spool connected to the shaft 54, and the measuring roller 2, are both locked, with the result that the portion of the film which is in the focal plane is held taut and is not slackened. A further feeding movement of the film cannot take place until the member 5 is raised, to disengage the pawl 42 from the gear 55 and to disengage the tooth 39 from the notch 40, this raising of the member 5 being accomplished at the proper time by mechanism described hereafter.

Referring now to the mechanism by which the driving gear 43 is turned from the winding knob 6, this mechanism and associated parts will be described with special reference to Figs. 5-8. As already stated, the winding knob 6 is fixed to a non-circular shaft 9, at the outside end thereof. Next inside of this knob 6, but rotatable on the shaft 9, is a film position indicator or exposure counter 57, having a conical surface which is graduated and numbered to cooperate with an index mark 131 on the wall of the camera. Teeth 58 are formed on an annular flange projecting leftwardly from the disk 57. Next to the left of the disk 57, and fixed on the non-circular shaft 9 so as to turn therewith, is the disk 32. This disk carries an arcuate projection 33 for a purpose which will be described later, and it also carries, on its left face, a pawl 48 pivoted to the disk at 133 and having a nose 49 for engaging a gear 44 which is mounted on the right face of the gear 43. An arcuate outer surface 50 of the pawl 48 is concentric with the circumference of the disk 32 when the nose 49 of the pawl 48 is engaged with the teeth of the gear 44, but projects outwardly beyond the periphery of the disk 32 when the pawl is not operatively coupled to the teeth of the gear 44.

This gear 44 is provided with a plurality of arcuate slots 45 concentric with the two gears 44 and 43, which receive pins 46 fixed to the gear 43, whereby the gear 44 is held in concentric position on the gear 43 but is capable of a limited amount of turning movement relative to the gear 43, in accordance with the lengths of the slots 45. A spring 47 constantly tends to turn the gear 44 in a counterclockwise direction relative to the gear 43 on which it is mounted, when viewed from the right as in Fig. 5, or to turn it in a clockwise direction when viewed from the left as in Fig. 7.

Mounted on the side wall of the camera body is a stationary guide member 72 (Fig. 8) of arcuate form concentric with and closely embracing the periphery of the disk 32 through part of its circumference but not the entire circumference. As the disk 32 turns to the point where the pawl 50 engages with the guide 72, this guide 72 restrains the portion 50 of the pawl 48 against moving radially outwardly and holds it in an inward position in which the nose 49 engages the teeth of the gear 44, thus effectively coupling the rotating disk 32 to the gear 44, which in turn is coupled to the gear 43 and causes corresponding rotation of the gear 43. This continues for about half or a little more than half of one complete revolution of the winding knob 6 and disk 32; but as the portion 50 of the pawl 48 reaches the end of the stationary guide 72, the portion 50 is no longer held in its inward position and may now spring radially outwardly so that the nose 49 of the pawl 48 may swing out from the teeth of the gear 44 and the disk 32 may now continue the rest of its cycle of one complete rotation, without causing any further rotation of the gears 44 and 43. The rest position of the disk 32 may be made to leave the pawl 48, 50 at any desired position relative to the stationary guide 72, of course, such as a position where the pawl is just about to enter the guide, or where it just leaves it, or in an intermediate position, so long as the other parts of the mechanism are properly timed in sequence relative to the position of the disk 32. In practice, however, it is preferred to time the parts so that at the rest position of the disk 32, the pawl 48 is just leaving the stationary guide 72. Consequently, at the beginning of the next feeding rotation, the pawl 48 will be disengaged from the gear 44 for a time, and then will be engaged with this gear during the latter part of the rotary cycle.

At the completion of a feeding cycle, when the gear 43 is stopped by any suitable stop mechanism, the winding knob 6 and the disk 32 may continue to turn through a short distance, because of the limited amount of turning which the gear 44 may perform relative to the gear 43, on account of the slots 45. This limited amount of turning is just enough to carry the disk 57 through one graduation or mark, so that it now registers (relative to the index mark 131) one additional exposure or film position. The drive of the measuring or position-indicating disk 57 is by means of a spring pressed pawl 59 on the right face of the disk 32, which pawl engages the teeth 58 on the disk 57. When the turning of the winding knob 6 is completed, and the operator lets go of this knob, it springs back (together with the disk 32) in a reverse direction, because of the action of the spring 47, and thus the pawl 59 engages the next tooth 58 of the film position indicating disk 57.

Also according to the present invention, very easily operated and low friction means is provided for cocking or tensioning the photographic shutter, opening the film gate, and performing various other functions by the rotation of the winding knob 6. This means includes the causing of movement of various slides and levers by means of a rotary member mounted eccentrically with respect to the shaft 9 which is turned by the winding knob 6. Projecting leftwardly from the left face of the disk 11 on the shaft 9 is a stud or member, eccentric with respect to the shaft 9, which forms the inner raceway of a ball bearing or roller bearing 13, the outer raceway of which is a circular ring 12 freely rotatable in a plane parallel to the disk 11 about an axis of rotation which is substantially offset from or eccentric relative to the axis of rotation of the shaft 9. The various slides and levers which are to be operated, are formed with portions in the path of movement of this rotary member 12 as the latter travels around the axis of the shaft 9 during one complete revolution of the latter. In this way, the parts are actuated with very little resistance, for a rolling contact is made with the various pins and levers to be operated, resulting in extremely easy operation as compared with the conventional eccentric cam, which produces a sliding contact with a pin or lever, rather than the rolling contact produced by the present mechanism.

The above mentioned shutter release plunger 7 mounted at the top of the camera body engages the end of a lever 28 (Fig. 5) the opposite end of which is mounted on a fixed pivot 141 in the camera body. Intermediate its length, this lever 28 has a shoulder 143.

The shaft 9 and hub 10 thereon are provided with a suitable one-way clutch of any known construction (not shown) which permits the shaft to turn freely in the direction of the arrow A in Fig. 5, that is, in a clockwise direction when viewed from the right as in Fig. 5, but which prevents any retrograde or counterclockwise motion. Early in the course of one complete rotation of the knob 6 and shaft 9 from its rest position to its next rest position, the eccentrically mounted actuating member 12 strikes against a pin 14 projecting laterally from a slide member 15 which is mounted for upward and downward movement on fixed pins 145 in the camera body, and moves the pin 14 upwardly, thereby raising the member 15 so that it engages behind the shoulder 143 on the shutter release lever 28 and locks this shoulder against downward movement, thereby locking the shutter release against premature actuation while the film winding is in progress. A forward extension of this slide member 15 has in it an approximately horizontal slot 26, which receives a pin 25 on the rear end of a shutter tensioning lever 20 fulcrumed on a pin 147 at a fixed point of the camera body. The forward end of the tensioning lever 20 extends through a slot 21 in a ring 22 mounted for oscillation on the shutter 8, about an oscillatory axis coinciding with the optical axis of the shutter and lens system. The ring 22 carries a forwardly projecting lug 29 which, upon leftward or counterclockwise oscillation of the ring (in the direction of the arrow B in Fig. 5) will come into contact with the shutter setting or tensioning lever 23 and will cause tensioning of the shutter, ready for the next exposure. Clockwise movement of the ring 22, in a direction opposite to the arrow B, if carried to a sufficient extent, will cause the lug 29 to engage the shutter release lever or trigger lever 24, to trip the shutter to make an exposure. At the same time that the slide member 15 moves upwardly (by contact of its pin 14 with the operating member 12) to block the shutter release parts 28, 143, the pin 25, due to its engagement with the slot 26, will cause the rear end of the lever 20 to tip upwardly and thus the forward end will tip downwardly and will cause counterclockwise movement of the ring 22 in the direction of the arrow B, thus operating the lever 23 and setting or tensioning the shutter ready for the next exposure.

Just to the right of the slide 15 is a second slide member 17 which likewise is guided for vertical movement on the pins 145 of the camera body by means of vertical slots on the slide 17. Also, this slide 17 is coupled to the slide 15, with a certain amount of lost motion, by means of a pin 18 on the slide 15 projecting into a slot 19 in the slide 17. As the slide 15 is moved upwardly by the engagement of the operating member 12 with its pin 14, the pin 18 on the slide 15 carries the slide 17 upwardly with it. As the knob 6, shaft 9, and operating member 12 continue their rotation, the latter rides out from under the pin 14 and releases the pin so that the slide 15 may drop downwardly to some extent by gravity, and as the rotary movement continues, the operating member 12 engages a pin 16 on the slide 17 and positively pulls the slide 17 downwardly, the slide 15 being forced to come down with it but not to the same extent, because of the lost motion connection 18, 19 between the two slides. The downward movement of the slide 15 is, however, sufficient so that the slot 26 of this slide 15 lowers the pin 25 on the lever 20, far enough to raise the forward end of this lever to swing the shutter ring 22 in a clockwise direction to bring the lug 29 around to a position next to the shutter tripping lever or arm 24, but without actually moving or actuating the arm 24.

The knob 6, shaft 9, and operating member 12, during their cycle of rotation, perform other functions also. Early in the cycle of rotation, the operating member 12 engages the pin 38 projecting laterally from an ear on the feed locking bar 5, and lifts this bar upwardly to serve the dual purpose of raising the pawl 42 to unlock the gear or ratchet 55 on the winding shaft 54, and also of disengaging the locking tooth or lug 39 from the locking notch 40 of the member 4 which is at this time coupled through the clutch 60, 61 to the measuring roller or drum 2. This raising of the member 5 to unlock the film feed parts occurs just before the part 50 of the pawl 49 (Fig. 7) enters the guide 72 (Fig. 8) so that the parts 2 and 54 are unlocked by the time the actual film feeding is ready to begin, in consequence of the action of the pawl 49 in rotating the gears 43 and 44. As already explained, the parts are again locked at the completion of the necessary length of film feeding, for at the end of one complete revolution of the measuring roller or drum 2, the notch 40 again comes into position under the tooth 39 so that the tooth 39 drops down into this notch (the operating member 12 meanwhile having moved on beyond the pin 38) and the downward movement of the member 5 permits the spring 129 to move the pawl 127 down into locking engagement with the gear or ratchet 55.

Still another function performed by rotation of the knob 6 and shaft 9 is that the operating member 12, just before it raises the pin 38 to unlock the member 5, contacts with the portion 37 of the lever 35 pivoted on the pivot 151 on the camera body, thereby raising the end 37 of this lever slightly upwardly and rearwardly and forcing the rear end 36 of this lever rearwardly against the film presser plate to move the presser plate rearwardly against the action of its spring and thereby to release the forward pressure of the plate which normally presses the film against the film gate at the focal plane. This occurs just before the slides 15 and 17 move upwardly. When the slide 17 moves upwardly, it engages with the portion 37 of the lever 35 and holds this lever in the position for releasing the film presser plate, even though the operating member 12 has meanwhile passed on beyond the portion 37, and thus the film presser plate is held in its relaxed or ineffective position until the slide 17 moves downwardly again, which is after the conclusion of the film winding operation.

As already explained, so long as the slide 15 remains in its upper position, it engages behind the shoulder 143 of the lever 128 and thus prevents premature operation of the shutter release plunger 7. However, the slide 15 moves downwardly before the winding of the film is completed. Therefore, it is desirable to provide additional means for locking the shutter release or tripping mechanism until the winding of the film is fully completed. This is done in the present instance by means of a lever 30 (Figs. 5 and 8) the rear end of which is pivoted on a fixed pivot 155 in the shutter casing, and the forward end of which carries a laterally extending pin 31 which, when the lever is fully raised, lies directly under the rear part of the lever 20, preventing downward movement of the rear part of this lever which would be necessary to raise the front part of this lever to turn the ring 22 far enough to cause the lug 29 to push and actuate the shutter tripping member 24. This lever 30 is held in its raised position at the appropriate time by means of a part 33 on the disk 32 which is fixed on the shaft 9. This part 33 has a cam shape arcuate edge or rim which, during part of the rotation of the disk 32, hooks under and raises an ear 34 on the lever 30, raising this ear and thereby raising the lever 30 and maintaining it in raised position so long as necessary to lock the shutter tripping mechanism against actuation. When the film winding operation is completed, the member 33 moves on beyond the ear 34 and thus the lever 30 is allowed to drop. This unlocks the tripping mechanism so that the operator may now press downwardly on the release plunger or tripping plunger 7, which causes downward movement of the lever 28. This in turn causes the shoulder 143 on the lever 28 to press downwardly on the top edge 27 of the slide 15, depressing the slide so that the slot 26 thereof depresses the pin 25 on the rear end of the lever 20, raising the front end of this lever so as to swing the ring 22 rightwardly or clockwise through an additional increment, causing the ear 29 to push downwardly on the shutter release lever or tripping lever 24, to actuate the shutter to make an exposure.

Figure 3:
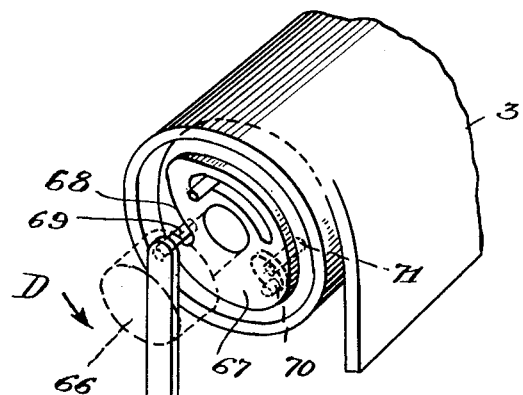
Fig. 3 is a perspective view showing the interconnection between the film measuring mechanism and the cassette sealing mechanism, as seen obliquely from the left rear.
Figure 4:
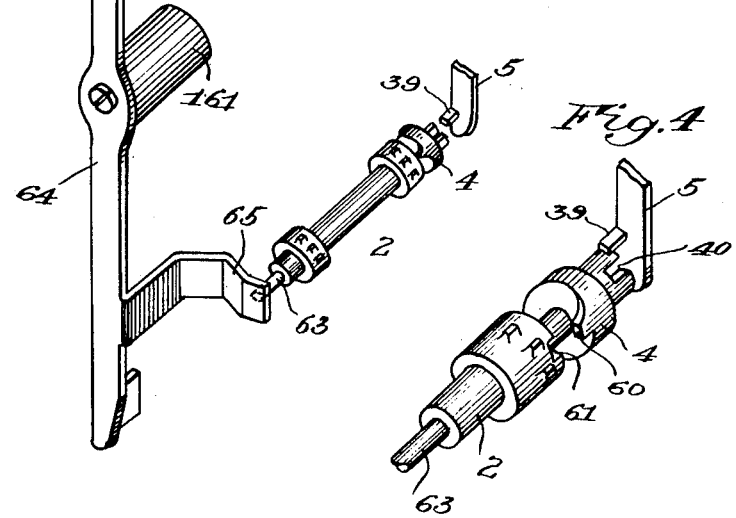
Fig. 4 is a similar perspective view of part of the mechanism shown in Fig. 3, on a larger scale.

When the last exposure has been made and the time comes for winding up the balance of the length of the film into the cassette 3, it is desirable to be able to do this rapidly and without impediment from the locking arrangement 39, 40 or the locking arrangement 127, 55. To accomplish this unlocking of the locking mechanism, the operator, when ready to wind up the final length of film, gives a slight turn to the knob 66 (Figs. 1 and 3) at the left side of the camera, which controls the sealing means of the cassette 3. This gives a partial rotation to the disk 67 connected to the knob 66, so that an oblique cam 68 in this disk engages with a pin 69 at the upper end of a lever 64 pivoted near its midpoint at 161 on the camera body. The upper end of this lever 64 is thereby moved forwardly, which moves the rear end rearwardly so that an oblique cam 65 formed on an ear of the lever 64 engages the end of the shaft or axle 63 which runs through the measuring roller or drum 2 and which is connected to the locking member 4. The action of the cam 65 pushes rightwardly on the shaft 63, thereby pushing the member 4 rightwardly against the natural resilience of the locking bar 5 and the resilience of a spring 62 which tends to move the lower end of the bar 5 leftwardly. This rightward movement of the shaft 63 and member 4 carries the tooth 60 on the member 4 out of the notch 61 on the drum 2, thus disconnecting the parts from each other. Thus the winding knob 6 may be turned rapidly to wind up the rest of the film into the cassette 3, without having to stop at the end of each frame length of the film. When all of the film has been wound into the cassette 3, the knob 66 may be turned further, so that a pin 70 on the disk 67 engages a pin 71 of the cassette sealing mechanism, and seals the entrance slot of the cassette in known manner.

It is noted that many different functions are performed by rotation of the main winding knob 6, and several of these functions are performed by contact of various parts with the eccentrically mounted rotary operating member 12 which turns very easily on its ball bearing 13. The rolling action of this member 12 on the various pins and parts with which it comes into contact, such as 14, 16, 37, and 38, is such as to produce the necessary movements with a very slight amount of friction and with little turning effort, much easier than with an ordinary cam. Moreover, the use of this rolling member 12 enables the elimination of special shapes of cams which have heretofore been customary in constructions of this same general type, and the use of the slide member 17 for partially controlling the presser plate releasing member 35, together with the lost motion connection between the two slides 15 and 17, likewise simplifies the construction and eliminates the need for special shapes of cams for operating these parts.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A photographic camera of the type including a take-up spool onto which film is wound for drawing a fresh unexposed film area into a focal plane ready for exposure, a manually rotatable motivating and controlling cycle member, drive gearing connecting the latter to the take-up spool means actuated by the cycle member for locking the take-up spool against film winding turning movement, a measuring roller engaging the film and turned by the feeding movement of the film, and means actuated by the cycle member for locking said measuring roller against rotation substantially simultaneously with the locking of said take-up spool.

2. A construction as defined in claim 1, in which said means for locking said measuring roller includes a film-contacting rotary portion and a locking rotary portion, and separable clutch means operatively connecting said two portions to each other.

3. A construction as defined in claim 2, further including a cassette surrounding said take-up spool, a cassette sealing member, and common operating means for moving said cassette sealing member and for disengaging the clutch means between said locking portion and said film engaging portion of said measuring roller.

4. A photographic camera including a shutter, shutter tensioning mechanism, film feed locking mechanism, and a rotary cycle member for operating said mechanisms, characterized by a disk eccentrically mounted on said rotary cycle member to move bodily therewith, and means contacting with and operated by said disk as it turns with said operating member for operating one of said mechanisms.

5. A construction as defined in claim 4, in which said eccentrically mounted disk operates both of said mechanisms.

6. A photographic camera including a shutter, shutter tensioning mechanism, film feed means locked against winding movement when the film is stationary, mechanism for unlocking said film feed means, and mechanism for shifting a film presser plate to relieve pressure against the film during feeding movement thereof, characterized by a manually operable rotary cycle member, an eccentric member mounted eccentrically on said cycle member to turn bodily therewith, and means making contact with and operated by said eccentric member during a single complete revolution of said rotary member for operating said shutter tensioning mechanism to tension the shutter, operate said pressure plate releasing mechanism to release pressure on the film, and operate said unlocking mechanism to unlock the film feed means for operation.

7. A construction as defined in claim 6, further including means operated by movement of said cycle member for driving said film feeding means.

8. A construction as defined in claim 7, further including means associated with said shutter tensioning mechanism for holding said presser plate shifting mechanism in released position after said eccentric member has moved beyond position for contacting with said presser plate shifting mechanism.

9. A construction as defined in claim 6, in which said eccentric member is a substantially circular member mounted for rotation on its own axis eccentric to the rotary axis of said cycle member, independently of rotation of said cycle member.

10. A construction as defined in claim 9, in which said eccentric member is mounted on a ball bearing on said rotary member.

11. A construction as defined in claim 4, further including a film measuring roller engaging the film and turned by movement of the film, and means for locking said film measuring roller against rotation, substantially simultaneously with the locking of said film feed means.

12. A construction as defined in claim 11, further including means comprising a pair of clutch elements separable to render said measuring roller locking means ineffective.

13. A construction as defined in claim 12, further including a cassette having a film take-up spool therein, and means associated with said cassette for separating said clutch elements to render said measuring roller locking means ineffective.

14. In a photographic camera the combination of a casing embodying a forward lens and shutter mechanism, the latter provided with setting and release elements, a rearward focal plane film support, film roll supply and winding means for drawing a film across the support, a measuring roll engaging the film and driven thereby to limit each movement of the film to one picture area, means for operating a film presser plate for pressing each picture area successively against the support, a manually rotatable motivating and controlling cycle member, and means all actuated thereby for driving the film feeding roll, substantially simultaneously locking and unlocking the latter and the measuring roll after each picture area has been fed, setting the shutter, and actuating the film presser plate operating means.

WILHELM KNAUF.

REFERENCES CITED

The following references are of record in the file of this patent:

UNITED STATES PATENTS

| Number | Name | Date |
|---|---|---|
| 2,511,215 | Mihalyi | June 13, 1950 |